(12) United States Patent
Kawata et al.

(10) Patent No.: US 8,797,575 B2
(45) Date of Patent: Aug. 5, 2014

(54) DYNAMIC CONTROL OF PACKET FILTERING PERIOD

(75) Inventors: Yuichi Kawata, Kanagawa (JP); Yoshifumi Bando, Kanagawa (JP); Keita Sakakura, Kanagawa (JP); Hiroaki Yamamoto, Kanagawa (JP); Kenichi Takahashi, Kanagawa (JP); Masakazu Kawashita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 377 days.

(21) Appl. No.: 12/858,086

(22) Filed: Aug. 17, 2010

(65) Prior Publication Data

US 2011/0228316 A1 Sep. 22, 2011

(30) Foreign Application Priority Data

Mar. 19, 2010 (JP) ................................ 2010-064704

(51) Int. Cl.
*G06F 3/12* (2006.01)

(52) U.S. Cl.
USPC ......... 358/1.15; 358/1.13; 370/290; 370/291; 370/497; 365/185.22

(58) Field of Classification Search
CPC ..... H04L 47/10; H04L 47/125; H04L 47/127; H04L 63/0245
USPC .......... 358/1.15, 1.16, 1.13; 365/185, 185.22; 370/392, 290, 291, 497; 710/260
See application file for complete search history.

(56) References Cited

U.S. PATENT DOCUMENTS

| | | | |
|---|---|---|---|
| 7,586,789 B2* | 9/2009 | Hsieh et al. | 365/185.22 |
| 2006/0067231 A1* | 3/2006 | Ikoma et al. | 370/235 |
| 2008/0310440 A1* | 12/2008 | Chen et al. | 370/413 |
| 2009/0073490 A1* | 3/2009 | Kawata et al. | 358/1.16 |
| 2010/0046533 A1* | 2/2010 | Kuramoto et al. | 370/401 |

FOREIGN PATENT DOCUMENTS

| | | |
|---|---|---|
| JP | 09-181748 A | 7/1997 |
| JP | 2005-347894 A | 12/2005 |
| JP | 2007-074210 A | 3/2007 |
| JP | 2010-050857 A | 3/2010 |

OTHER PUBLICATIONS

Office Action issued Jan. 7, 2014 in Japanese Patent Application No. 2010-064704.

\* cited by examiner

*Primary Examiner* — Jacky X Zheng
(74) *Attorney, Agent, or Firm* — Sughrue Mion, PLLC (57) ABSTRACT

A communication control apparatus including: a count portion that counts the number of received data; and a discard portion that is provided at an upstream side of a control portion on a forwarding route of the received data, and discards received data according to a counted value by the count portion.

9 Claims, 6 Drawing Sheets

■ WHEN FILTER TIME PERIOD IS NOT EXTENDED
------- NUMBER OF RECEIVED PACKETS OF RECEPTION UNIT
———— NUMBER OF RECEIVED PACKETS OF DMA UNIT

FIG. 5B

■ WHEN FILTER TIME PERIOD IS EXTENDED
------- NUMBER OF RECEIVED PACKETS OF RECEPTION UNIT
———— NUMBER OF RECEIVED PACKETS OF DMA UNIT

DYNAMIC CONTROL OF PACKET FILTERING PERIOD

CROSS-REFERENCE TO RELATED APPLICATION

This application is based on and claims priority under 35 USC 119 from Japanese Patent Application No. 2010-064704 filed on Mar. 19, 2010.

BACKGROUND (i) Technical Field

The present invention relates to a communication control apparatus, an image forming apparatus, and a computer readable medium.

(ii) Related Art

Conventionally, there has been known a computer system that controls a network interface card (NIC) such that a CPU discards a received packet when the CPU judges that the number of interruptions to the CPU by the reception of packets exceeds a threshold value.

SUMMARY

According to an aspect of the present invention, there is provided a communication control apparatus including: a count portion that counts the number of received data; and a discard portion that is provided at an upstream side of a control portion on a forwarding route of the received data, and discards received data according to a counted value by the count portion.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of an exemplary embodiment of the present invention.

Figure 1:
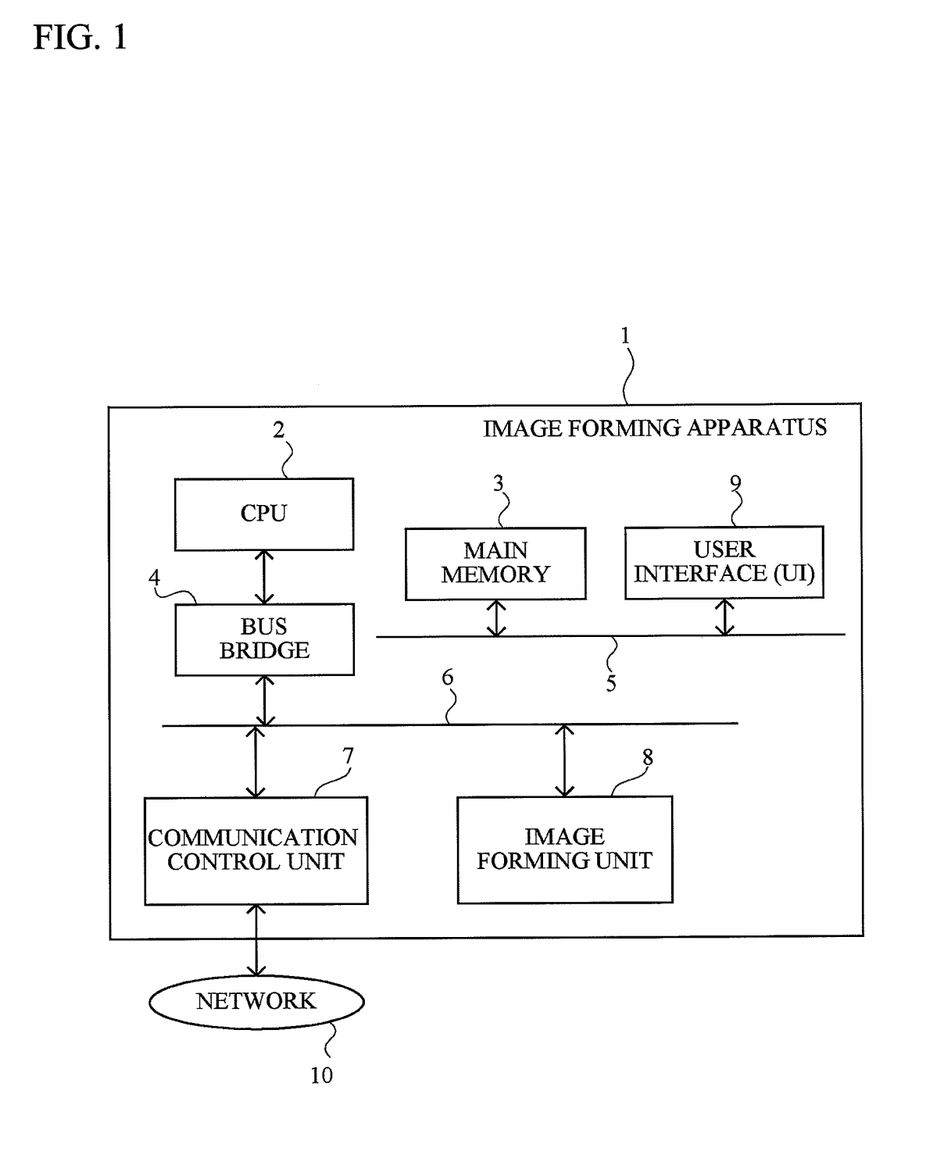
FIG. 1 is a block diagram showing an example of the construction of an image forming apparatus.

FIG. 1 is a block diagram showing an example of the construction of an image forming apparatus.

An image forming apparatus 1 in FIG. 1 is a multi function peripheral (MFP), for example. The image forming apparatus 1 includes: a CPU 2 (a control portion) controlling the operation of the whole image forming apparatus; a main memory 3 storing various programs and data; a bus bridge 4 bridging between a bus 5 and a bus 6; a communication control unit 7 communicating with other device, not shown, via a network 10; an image forming unit 8 forming an image on a recording medium; and a user interface (UI) 9.

The buses 5 and 6 are composed of PCI (Peripheral Component Interconnect) buses or PCI Express buses. The CPU 2 communicates with the main memory 3 and the UI 9 via the bus bridge 4 and the bus 5, and communicates with the communication control unit 7 and the image forming unit 8 via the bus bridge 4 and the bus 6. The communication control unit 7 is a network interface card as a communication control apparatus. The image forming unit 8 includes a photosensitive drum, a transfer belt, a developing unit, a fixing unit, not shown. The UI 9 is a display device with a touch panel, for example. The UI 9 is used for setting and displaying the number of output sheets, an output method, and so on.

Figure 2:
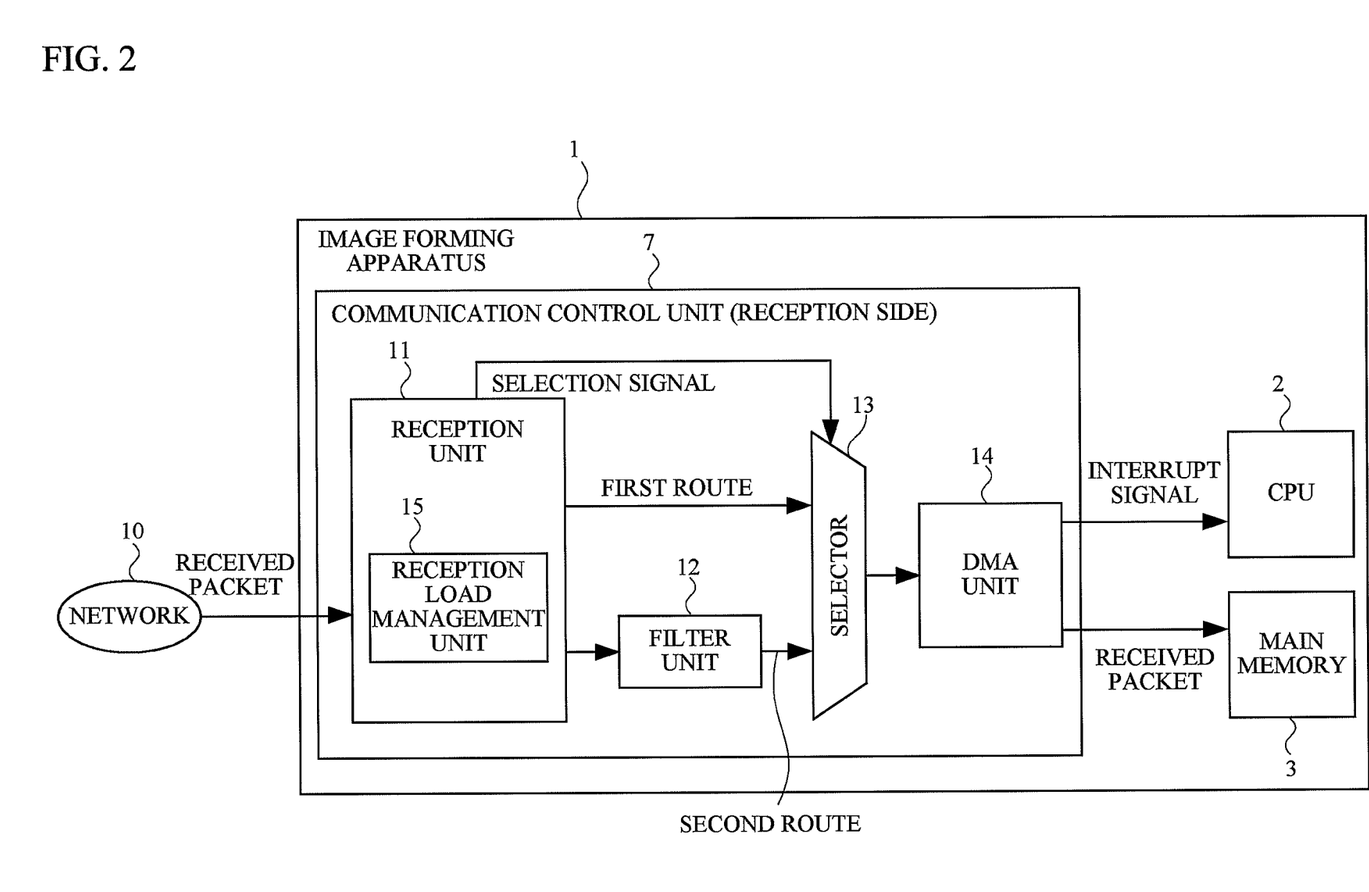
FIG. 2 is a block diagram showing the construction of a communication control unit 7 in FIG. 1.

FIG. 2 is a block diagram showing the construction of the communication control unit 7 in FIG. 1. FIG. 2 shows the construction receiving a packet in the communication control unit 7.

The communication control unit 7 includes a reception unit 11, a filter unit 12 (a discard portion), a selector 13, and a direct memory access (DMA) unit 14. The reception unit 11 receives a packet from the network 10. It should be noted that data which the reception unit 11 receives is not limited to data with a packet format. The reception unit 11 includes a reception load management unit 15 (a count portion and a judgment portion) managing a load of a received packet as the received data. The filter unit 12 discards a specific received packet output from the reception unit 11. The specific received packet to be discarded is a broadcast packet other than an address resolution protocol (ARP) packet addressed to oneself, for example. Alternatively, the specific received packet may be all packets received by the filter unit 12. In the following description, the received packet indicates the broadcast packet other than the address resolution protocol (ARP) packet addressed to oneself. The selector 13 selects any one of a first route between the selector 13 and the reception unit 11, and a second route between the selector 13 and the filter unit 12, according to a selection signal from the reception load management unit 15. The DMA unit 14 outputs the received packet to the main memory 3, and outputs an interrupt signal to the CPU 2 when outputting the received packet to the main memory 3 is completed. The communication control unit 7 is provided at an upstream side of the CPU 2 on a forwarding route of the received packet (i.e., a route on which the received packet is forwarded from the network 10 to the main memory 3). The reception load management unit 15 is provided at an upstream side of the filter unit 13 on the forwarding route of the received packet.

When the reception unit 11 receives the packet from the network 10, the reception load management unit 15 judges whether the number of received packets is equal to or more than a predetermined threshold value. When the number of received packets is equal to or more than the predetermined threshold value, the reception load management unit 15 outputs the selection signal for selecting the first route to the selector 13. Thereby, the received packet is discarded by the filter unit 12, and is not output to the DMA unit 14. On the other hand, when the number of received packets is less than the predetermined threshold value, the reception load management unit 15 outputs the selection signal for selecting the second route to the selector 13. Thereby, the received packet is output to the DMA unit 14 via the selector 13.

The reception load management unit 15 judges whether the number of received packets at a predetermined time period (hereinafter referred to as "a filter time period") is equal to or more than a predetermined threshold value. The filter time period is a time period when the filter unit 12 discards the received packet. When the number of received packets at the filter time period is equal to or more than the predetermined threshold value, the reception load management unit 15 maintains a state where the selection signal for selecting the second route has been output to the selector, or a state where the filter unit 12 discards the received packet. That is, the reception load management unit 15 extends the filter time period. When the number of received packets at the filter time period is less than the predetermined threshold value, the reception load management unit 15 outputs the selection signal for selecting the first route to the selector 13. Thereby, the received packet is output to the DMA unit 14 via the selector 13. It should be noted that the CPU 2 sets the above-mentioned predetermined threshold value and the above-mentioned filter time period to the reception load management unit 15 when the image forming apparatus 1 is initialized.

The received packet received by the DMA unit 14 is output to the main memory 3. The DMA unit 14 outputs the interrupt signal to the CPU 2 when outputting the received packet to the main memory 3 is completed.

Figure 3:
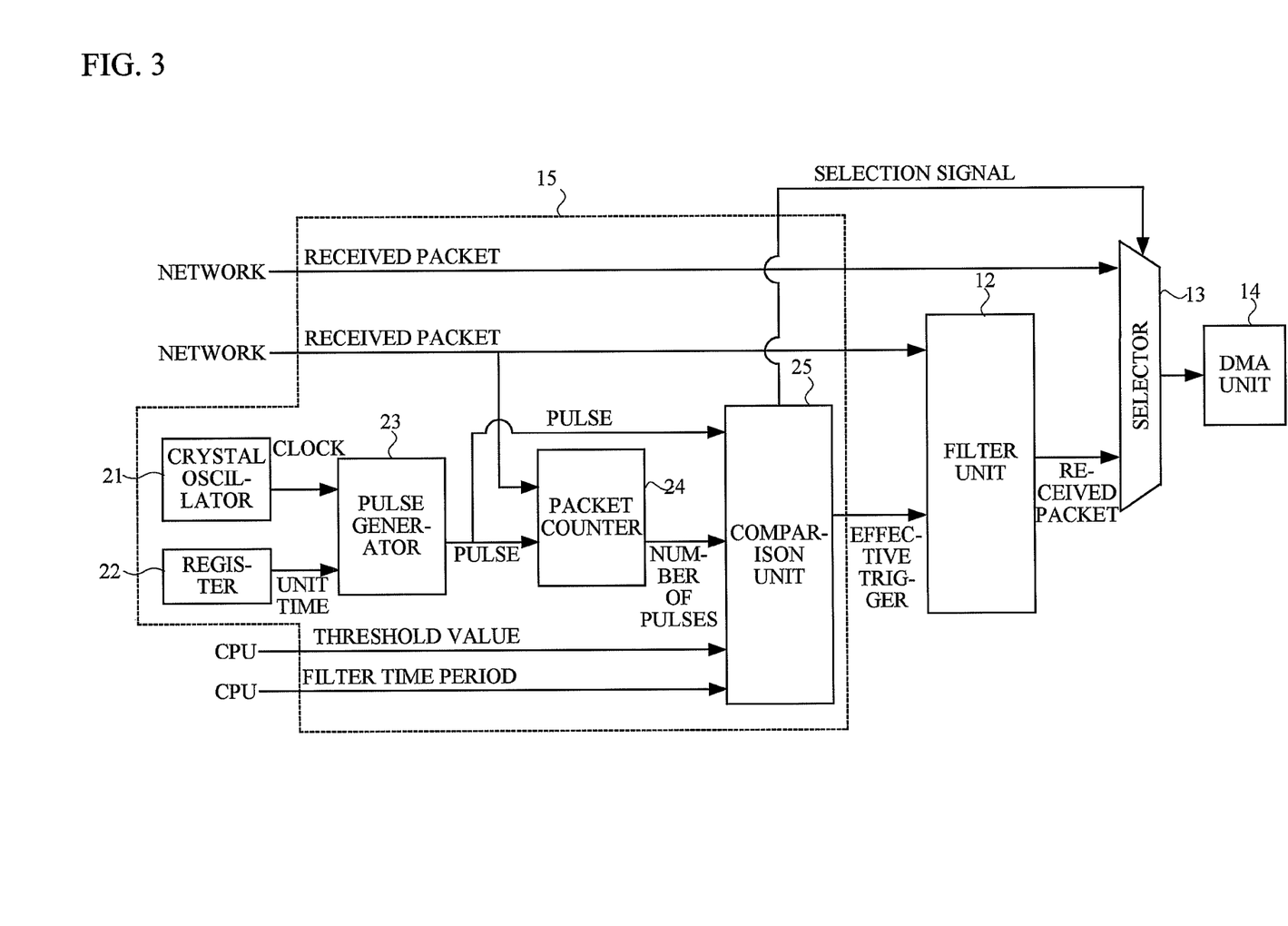
FIG. 3 is a block diagram showing the construction of a reception load management unit 15 in FIG. 2.

FIG. 3 is a block diagram showing the construction of the reception load management unit 15 in FIG. 2.

The reception load management unit 15 includes a crystal oscillator 21, a register 22, a pulse generator 23, a packet counter 24 (a count portion), and a comparison unit 25 (a discard portion, and a judgment portion). The register 22 outputs setting information of a unit time to the pulse generator 23. The unit time is a time period from output of a certain pulse to output of a next pulse, and a minimum unit in which the packet counter 24 counts the number of received packets. The setting information of the unit time indicates the number of clocks per the unit time. The setting information of the unit time is set to the register 22 by the CPU 2 when the image forming apparatus 1 is initialized.

The pulse generator 23 generates a pulse based on a clock output from the crystal oscillator 21 and the setting information of the unit time output from the register 22, and outputs the generated pulse to the packet counter 24 and the comparison unit 25. The packet counter 24 receives the pulse output from the pulse generator 23, and the packet from the network 10, and then counts the number of packets per the unit time. The packet counter 24 outputs information on the number of packets per the unit time to the comparison unit 25.

The comparison unit 25 acquires information on the threshold value of the number of packets, and the filter time period from the CPU 2. It should be noted that the filter time period is an integral multiple of the unit time, for example. The comparison unit 25 receives the pulse from the pulse generator 23, and the information on the number of packets per the unit time from the packet counter 24. The comparison unit 25 compares the number of packets per the unit time with the threshold value in reception timing of the pulse. When the number of packets per the unit time is equal to or more than the threshold value, the comparison unit 25 outputs a trigger (e.g. a signal) that makes the filter unit 12 effective, to the filter unit 12, and further outputs the selection signal for selecting the second route to the selector 13. Thereby, the received packet from the network 10 is discarded by the filter unit 12.

The comparison unit 25 further judges whether the number of received packets during each unit time in the filter time period is equal to or more than the threshold value. When the number of received packets during each unit time is equal to or more than the threshold value, the comparison unit 25 extends the filter time period. When the number of received packets during each unit time is less than the threshold value, the comparison unit 25 does not extend the filter time period. That is, even during the filter time period, the comparison unit 25 judges whether to extend the filter time period, for each unit time. When the state where the number of received packets is equal to or more than the threshold value continues, the filter is reset every time each unit time elapses. As a result, the filter time period is extended.

The comparison unit 25 may judge whether the number of received packets during the last unit time (i.e., unit time immediately before the filter time period elapses) in the filter time period is equal to or more than the threshold value. In this case, when the number of received packets during the last unit time in the filter time period is equal to or more than the threshold value, the comparison unit 25 extends the filter time period. When the number of received packets during the last unit time in the filter time period is less than the threshold value, the comparison unit 25 does not extend the filter time period.

Figure 4:
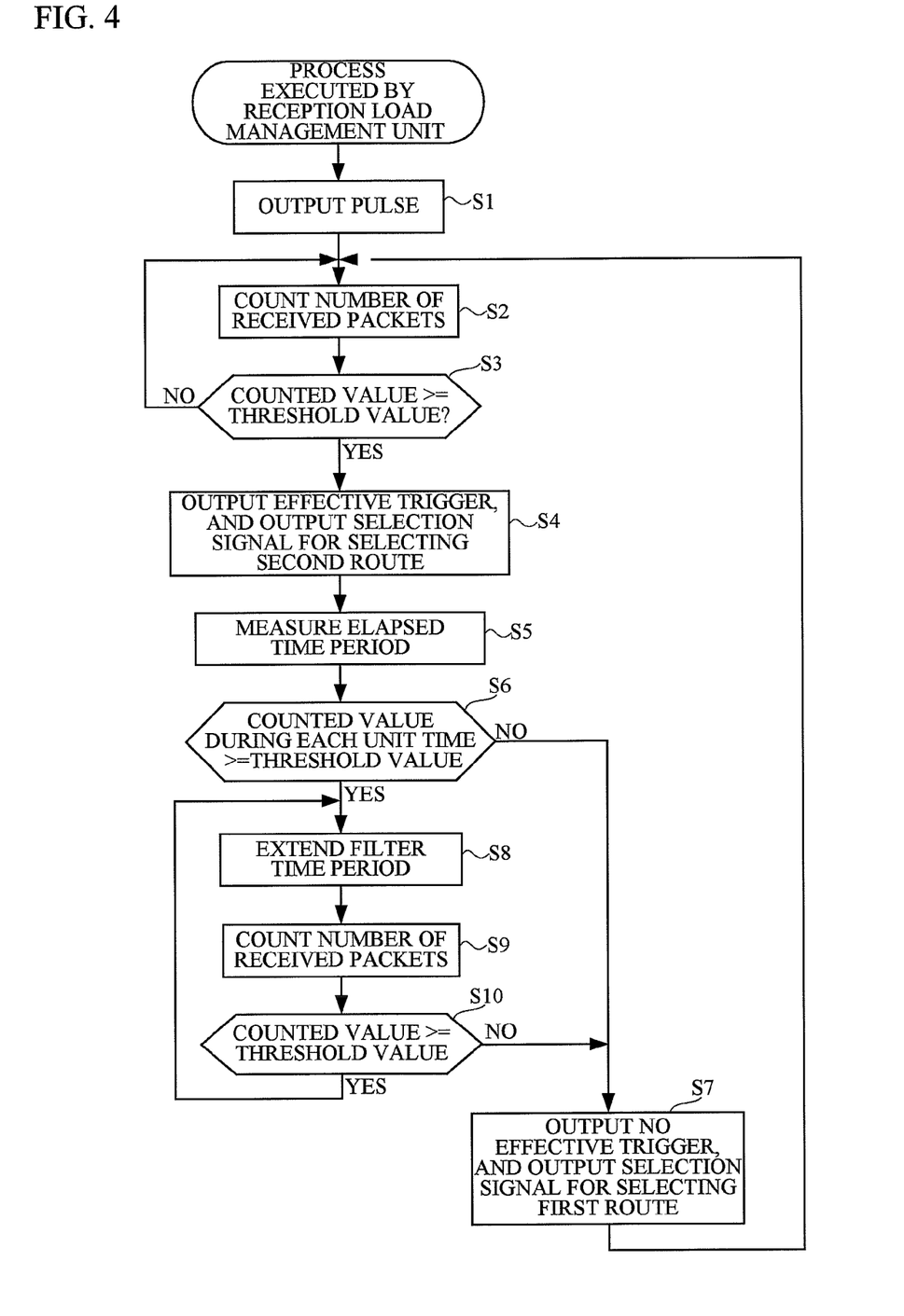
FIG. 4 is a flowchart showing a process executed by the reception load management unit 15.

FIG. 4 is a flowchart showing a process executed by the reception load management unit 15.

The pulse generator 23 outputs the pulse to the packet counter 24 and the comparison unit 25 (step S1). The packet counter 24 counts the number of received packets per the unit time, and outputs a counted value to the comparison unit 25 (step S2). The comparison unit 25 judges whether the counted value is equal to or more than the threshold value (step S3). When the answer to the judgment of step S3 is "NO", the procedure returns to step S2. When the answer to the judgment of step S3 is "YES", the comparison unit 25 outputs the trigger (e.g. signal) that makes the filter unit 12 effective, to the filter unit 12, and further outputs the selection signal for selecting the second route to the selector 13 (step S4). Thereby, the received packet is discarded by the filter unit 12. According to steps S3 and S4, the comparison unit 25 judges whether to discard the received packet according to the counted value by the packet counter 24.

Next, the comparison unit 25 measures an elapsed time period from the start time of filtering of the received packet, based on the pulse received from the pulse generator 23 (step S5). The comparison unit 25 judges whether the number of received packets (i.e., the counted value) during each unit time in the filter time period is equal to or more than the threshold value (step S6).

When the answer to the judgment of step S6 is "NO", the comparison unit 25 does not output the trigger that makes the filter unit 12 effective, to the filter unit 12, but outputs the selection signal for selecting the first route to the selector 13 (step S7). Thereby, the filter time period is not extended, and the received packet is output to the DMA unit 14 via the selector 13. Then, the procedure returns to step S2. When the answer to the judgment of step S6 is "YES", the comparison unit 25 extends the filter time period (step S8). In this case, the comparison unit 25 executes nothing. That is, the comparison unit 25 may extend the filter time period by maintaining the state where the filter unit 12 discards the received packet. Moreover, the comparison unit 25 may extend the filter time period by outputting the trigger that makes the filter unit 12 effective, to the filter unit 12 again, and further outputting the selection signal for selecting the second route to the selector 13 again. The filter time period may be extended for each unit time or plural unit times.

Figure 5A:
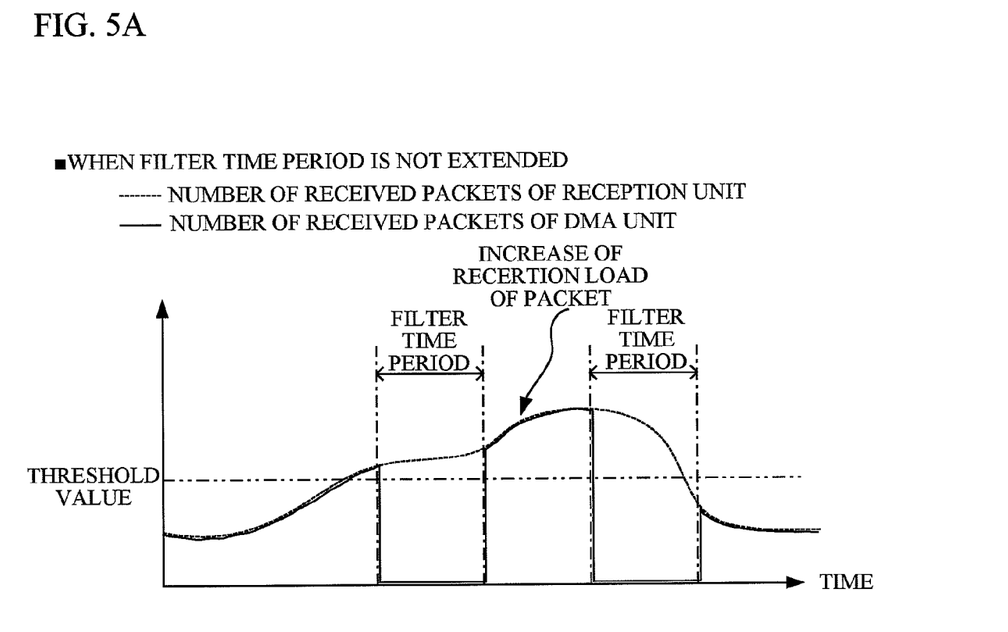
FIG. 5A is a diagram showing a relationship of the number of received packets of a reception unit 11 and a direct memory access (DMA) unit 14 when a filter time period is not extended.
Figure 5B:
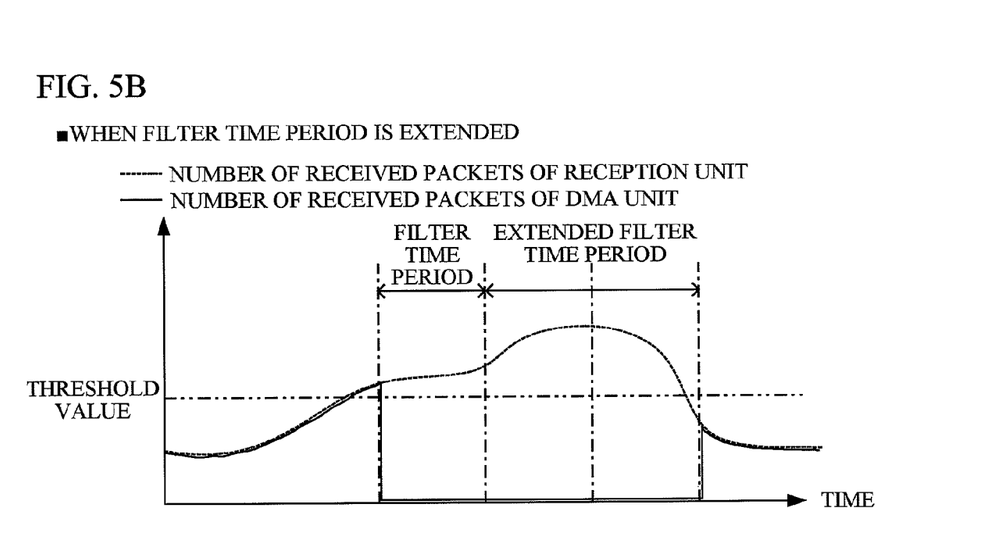
FIG. 5B is a diagram showing a relationship of the number of received packets of the reception unit 11 and the direct memory access (DMA) unit 14 when the filter time period is extended.

Here, FIG. 5A shows a relationship of the number of received packets of the reception unit 11 and the DMA unit 14 when the filter time period is not extended. FIG. 5B shows a relationship of the number of received packets of the reception unit 11 and the DMA unit 14 when the filter time period is extended.

According to step S8 in FIG. 4, the filter time period is extended as shown in FIG. 5B, and hence the comparison unit 25 prevents the reception load of the packet from increasing after the filter time period has elapsed. Therefore, the comparison unit 25 prevents troubles caused by the increase of the reception load of the packet (e.g. disturbance of the display of the UI 9, and a crack of the image formed on the recording medium).

The packet counter 24 counts the number of received packets per the unit time, and outputs a counted value to the comparison unit 25 (step S9). The comparison unit 25 judges whether the counted value is equal to or more than the threshold value (step S10). When the answer to the judgment of step S10 is "YES", the procedure returns to step S8, and the comparison unit 25 extends the filter time period again. When the answer to the judgment of step S10 is "NO", the procedure proceeds to step S7, and the comparison unit 25 stops extending the filter time period. Therefore, when the filter time period is extended for plural unit times, the filter time period to be extended is shorten by a route of "NO" in step S10 and step S7. For example, when the filter time period is extended for five unit times, the length of the filter time period to be extended may become a single unit time by the route of "NO" in step S10 and step S7.

Figure 6A:
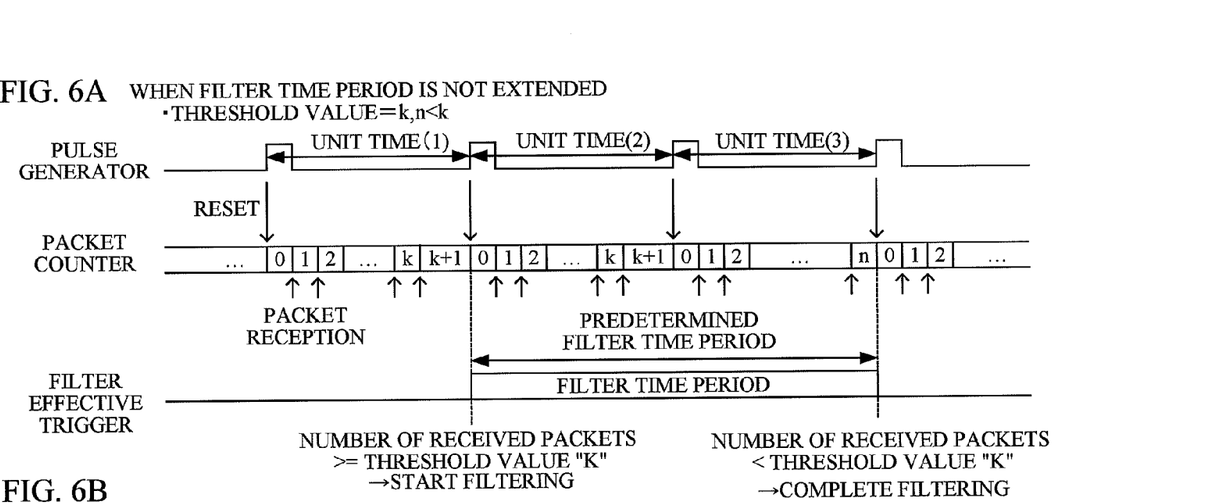
FIGS. 6A and 6B are timing charts showing a relationship between a pulse output from a pulse generator 23, a counted value of a packet counter 24, and the filter time period.
Figure 6B:
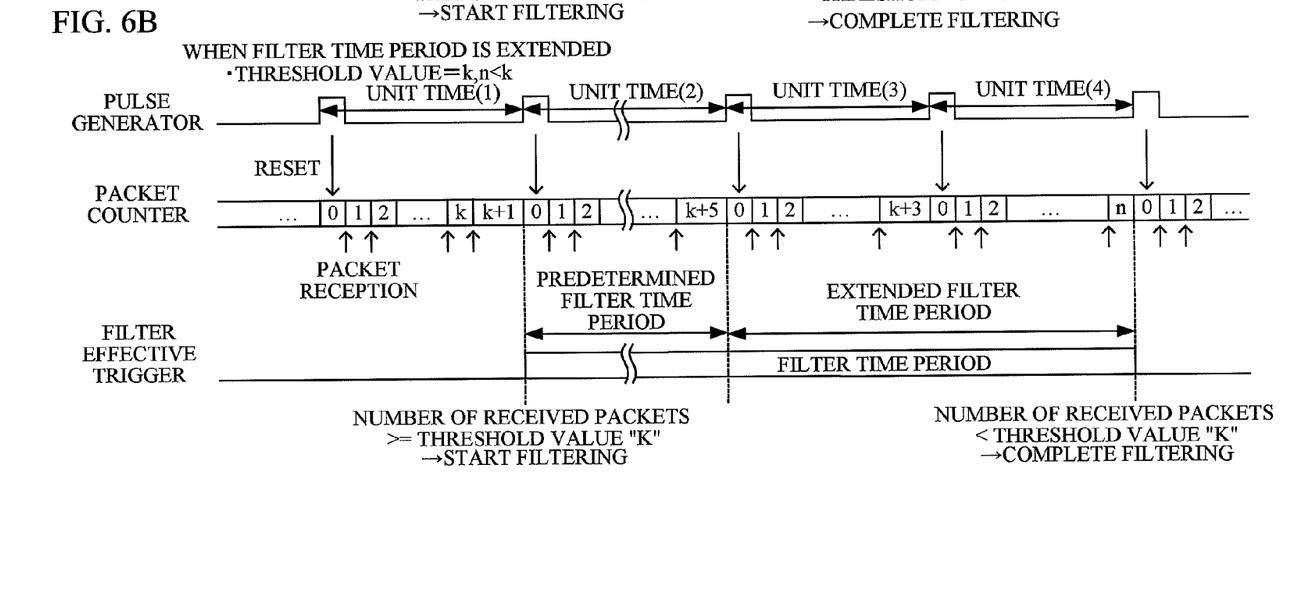

FIGS. 6A and 6B are timing charts showing a relationship between the pulse output from the pulse generator 23, the counted value of the packet counter 24, and the filter time period. FIG. 6A shows an example in which the filter time period is not extended. FIG. 6B shows an example in which the filter time period is extended.

It is assumed that, in FIG. 6A, the filter time period determined by the CPU 2 is a unit time (2) and a unit time (3). It is assumed that, in FIGS. 6A and 6B, the threshold value is "k", and the number of received packets "n" is smaller than the threshold value "k". In FIGS. 6A and 6B, every time the pulse generator 23 outputs the pulse, the packet counter 24 resets the counted value to "0". Since the counted value "n" of the packet counter 24 is equal to or more than the threshold value "k" in a unit time (1) of FIGS. 6A and 6B, the filter time period is started from the unit time (2). Since the counted value "n" of the packet counter 24 is less than the threshold value "k" in the unit time (3) of FIG. 6A, the filter time period is completed.

It is assumed that, in FIG. 6B, the filter time period determined by the CPU 2 is the unit time (2). Since the counted value "n" of the packet counter 24 is equal to or more than the threshold value "k" in the unit time (2) of FIG. 6B, the filter time period is extended. Since the counted value "n" of the packet counter 24 is equal to or more than the threshold value "k" in the unit time (3) of FIG. 6B, the filter time period is additionally extended. Since the counted value "n" of the packet counter 24 is less than the threshold value "k" in a unit time (4) of FIG. 6B, the filter time period is completed.

As described above, according to the present exemplary embodiment, the communication control unit 7 includes the packet counter 24 that counts the number of received packets, and a filter unit 12 that is provided at the upstream side of the CPU 2 on the forwarding route of the received packet, and discards the received packet according to the counted value by the packet counter 24. Therefore, during not only an invalid time period of discard of the received packet, but also a discard time period of the received packet, the number of received packets is counted and the received packet is discarded according to the counted value. Therefore, a load imparted to the CPU 2 can be reduced when the received data is discarded. A resource of the CPU 2 that has been conventionally used for a count process of the interrupt signals corresponding to the number of received packets and a discard judgment process of the received packet can be assigned to other processes.

The packet counter 24 and the comparison unit 25 are provided at the upstream side of the filter unit 12 on the forwarding route of the received packet (i.e., a route on which the received packet is forwarded from the network 10 to the main memory 3). Therefore, during not only an invalid time period of the filter unit 12, but also a valid time period of the filter unit 12 (i.e., the filter time period), the packet counter 24 counts the number of received packets and the comparison unit 25 judges whether to discard the received packet. It should be noted that, when the CPU 2 counts the interrupt signals corresponding to the number of received packets and judges whether to discard the received packet, the CPU 2 cannot execute the processes (i.e., the count process and the discard judgment process) during the filter time period. This is because the received packet is blocked by the selector 13 during the filter time period, so that the CPU 2 cannot count the interrupt signals corresponding to the number of received packets and judge whether to discard the received packet according to the counted value.

Also, during not only the invalid time period of the filter unit 12, but also the valid time period of the filter unit 12 (i.e., the filter time period), the packet counter 24 counts the number of received packets and the comparison unit 25 judges whether to discard the received packet. Therefore, the comparison unit 25 can adjust (i.e., extend or reduce) the length of the filter time period during the filter time period.

A recording medium on which the software program for realizing the functions of the communication control apparatus (i.e., communication control unit 7) is recorded may be supplied to the communication control apparatus, and the reception load management unit 15 may read and execute the program recorded on the recording medium. In this manner, the same effects as those of the above-described exemplary embodiment can be achieved. The recording medium for providing the program may be a CD-ROM, a DVD, or a SD card, for example.

Alternatively, the communication control apparatus may execute a software program for realizing the functions of the communication control apparatus, so as to achieve the same effects as those of the above-described exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A communication apparatus comprising:
    a memory that stores a value indicating a packet measurement period;
    a network interface that receives data packets;
    a packet filter that discards data packets; and a comparison unit that determines whether a first number of data packets received by the network interface during a first packet measurement period exceeds a predetermined threshold, controls the packet filter to discard data packets received by the network interface during a packet filtering period following the first packet measurement period, determines whether a second number of data packets received by the network interface during a second packet measurement period following the first packet measurement period exceeds the predetermined threshold, and controls the packet filter to continuously discard data packets received by the network interface for a period of time after the packet filtering period.

2. The communication apparatus according to claim 1, wherein a duration of the packet filtering period is equal to a duration of the packet measurement period.

3. The communication apparatus according to claim 2, wherein the comparison unit controlling the packet filter extends the duration of the packet filtering period by the period of time.

4. The communication apparatus according to claim 2, wherein the period of time is equal to the duration of the packet filtering period.

5. The communication apparatus according to claim 2, wherein the comparison unit controlling the packet filter renews the packet filtering period.

6. The communication apparatus according to claim 1, wherein a duration of the packet filtering period is greater than a duration of the packet measurement period.

7. The communication apparatus according to claim 6, wherein the comparison unit controlling the packet filter extends the duration of the packet filtering period by the duration of the packet measurement period.

8. The communication apparatus according to claim 6, wherein the period of time is equal to the duration of the packet filtering period.

9. The communication apparatus according to claim 6, wherein the comparison unit controlling the packet filter renews the packet filtering period.

* * * * *